United States Patent [19]

Perrson

[11] Patent Number: 5,133,428
[45] Date of Patent: Jul. 28, 1992

[54] DIRECTION-ADJUSTABLE SPEAKER SYSTEM

[76] Inventor: John K. Perrson, 247 Colton St., Newport Beach, Calif. 92663

[21] Appl. No.: 680,524

[22] Filed: Apr. 4, 1991

[51] Int. Cl.$^5$ .................. H05K 5/00; A47B 81/06
[52] U.S. Cl. ............................ 181/153; 181/199
[58] Field of Search ............. 181/148, 149, 153, 154, 181/199, 144, 147, 145, 146; 381/188, 205

[56] References Cited

U.S. PATENT DOCUMENTS

| | | | |
|---|---|---|---|
| 4,292,679 | 9/1981 | Kondo et al. | 181/146 X |
| 4,365,114 | 12/1982 | Soma | 181/144 X |
| 4,441,577 | 4/1984 | Kurihara | 181/147 |
| 4,445,228 | 4/1984 | Bruni | 181/199 X |
| 4,450,495 | 5/1984 | Naruki | 360/137 |
| 4,553,630 | 11/1985 | Ando | 181/144 |
| 4,580,653 | 4/1986 | Owens | 181/145 X |
| 4,630,303 | 12/1986 | Tanno | 181/145 X |
| 4,768,870 | 9/1988 | Chen | 381/205 X |
| 4,884,655 | 12/1989 | Freadman et al. | 181/145 |
| 4,917,212 | 4/1990 | Iwaya | 181/154 X |
| 4,953,223 | 8/1990 | Householder | 381/188 |
| 4,974,759 | 12/1990 | McDonough | 381/188 X |

Primary Examiner—L. T. Hix
Assistant Examiner—Jae Noh
Attorney, Agent, or Firm—Knobbe, Martens, Olson & Bear

[57] ABSTRACT

Disclosed is a swivel speaker system to custom-aim sound emanating from the speaker towards a listener. A speaker device of the present system comprises a sound driver disposed within a mount positioned within a housing. The mount swivels within the housing to direct the radiating frequencies to a desired location within a unique environment without obstructively projecting from a mounting surface. Preferably, the speaker has a minimum size to enable mounting at unconventional locations. Additionally, the speaker system, in accordance with another embodiment, provides a modular system having interchangeable support components which customizes the speaker to adapted to unique mounting surfaces in unique listening environments.

11 Claims, 5 Drawing Sheets

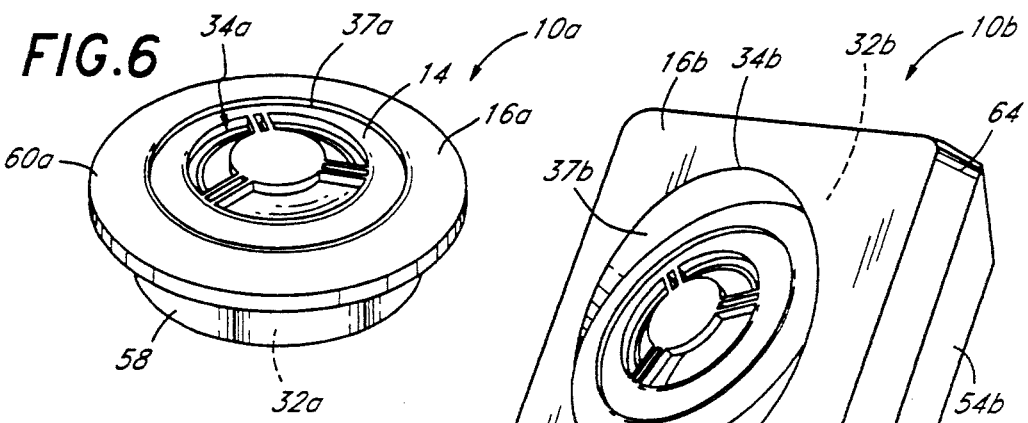
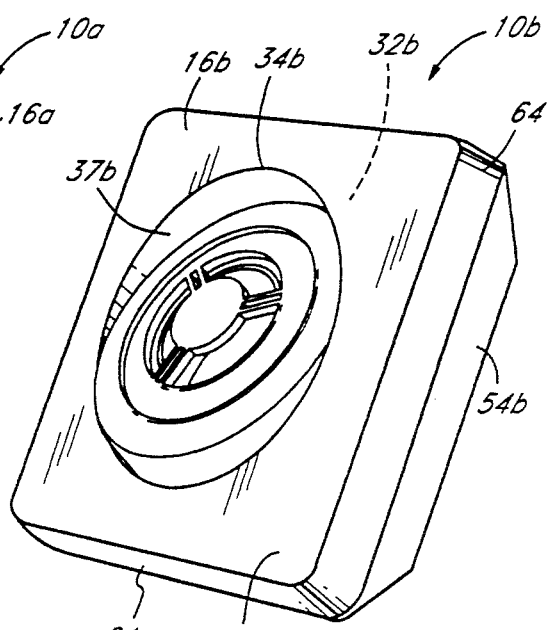
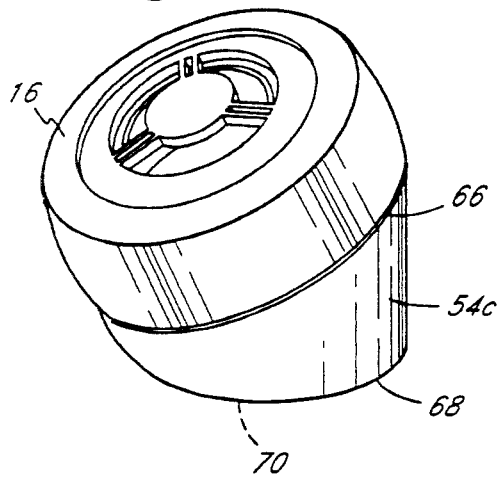
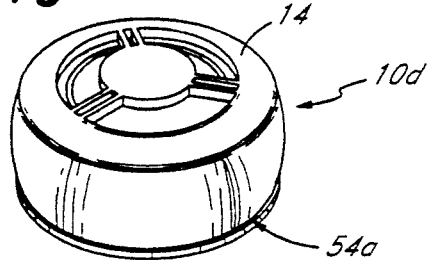
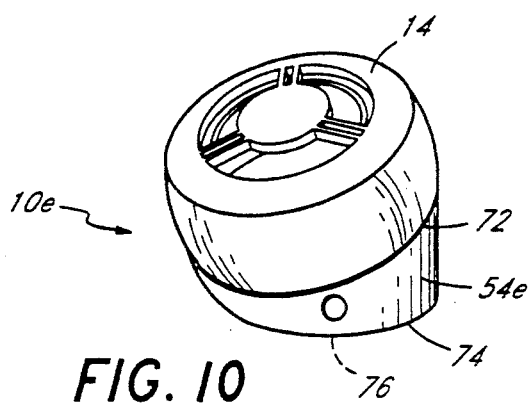

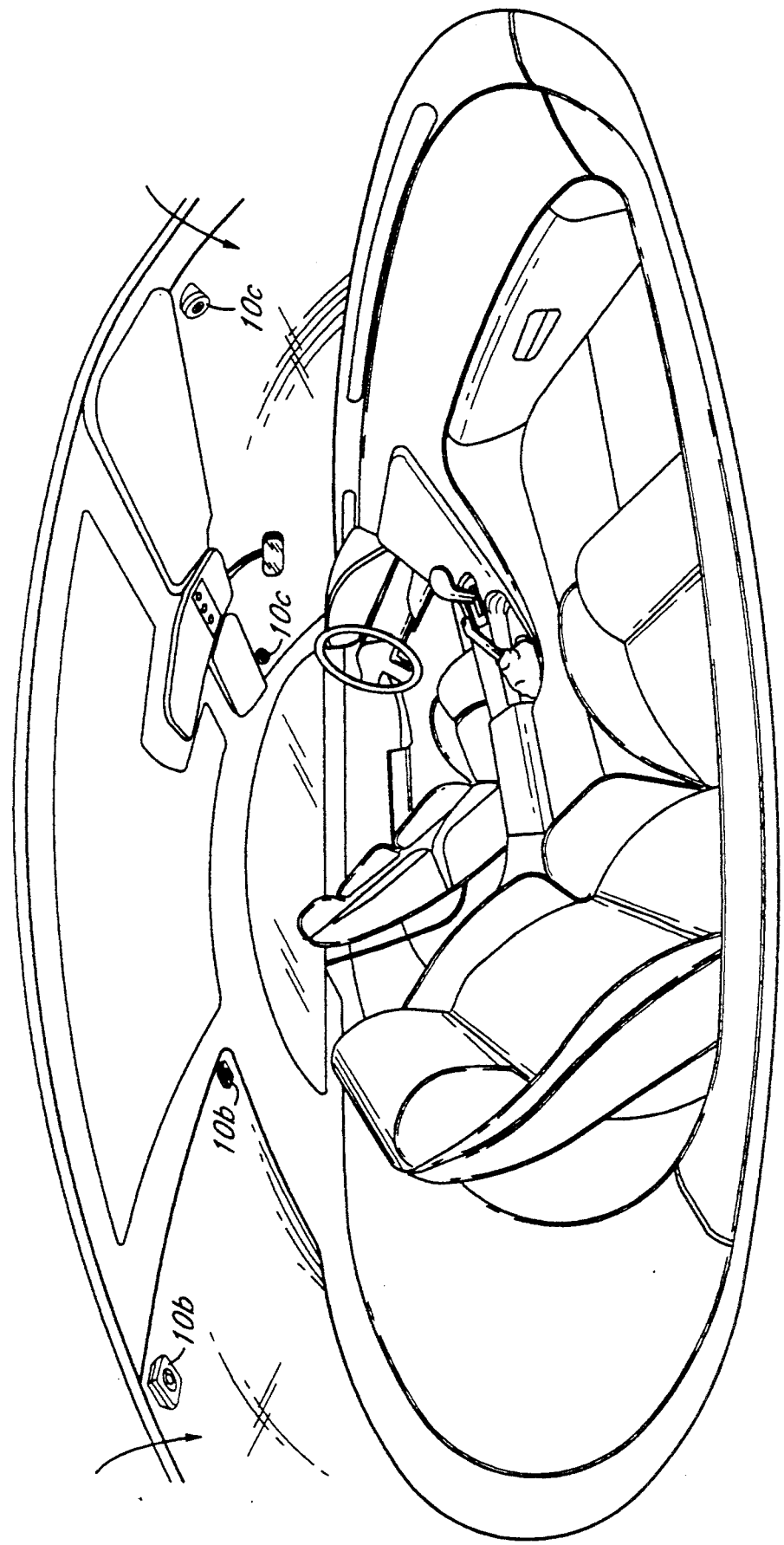
FIG. II

DIRECTION-ADJUSTABLE SPEAKER SYSTEM

BACKGROUND OF THE INVENTION

1. Field of the Invention

The present invention generally relates to audio sound systems, and more particularly to direction-adjustable audio speaker systems adapted for installation in a vehicle passenger compartment.

2. Description of Related Art

Sound, particularly high frequency sound, has a narrow dispersion band width, and thus, is very directional. In order to optimize sound imaging, high frequency sound must be directed at the listener. Therefore, speaker placement is critical to the quality of an automobile sound system. Unfortunately, conventional audio speakers mounted in vehicle passenger compartments cannot custom-aim sound to the listener.

Every model of vehicle differs in layout and dimension, and thus, no stationary speaker is perfectly suited for every vehicle. Moreover, the conventional positioning of speakers within the passenger compartment further inhibits the ability to custom-aim sound at the listener. Typically, audio speakers mount in vehicle door panels, dashes or rear decks, directing sound towards the roof or the listener's feet.

A number of previous speaker systems have been designed with the purpose of enabling the user to direct high frequency sound towards the listener. For example, U.S. Pat. No. 4,630,303 to Tanno discloses a speaker system for automotive stereo sets including a body housing a high range and a low range speaker, wherein the high range speaker can be moved from a retracted position to an extended position to avoid obstructions such as headrests. A motor and a series of gears used to raise the speaker can also be used to alter the vertical angle of the speaker in an effort to direct the sound toward the occupant of the passenger compartment. Unfortunately, the Tanno system is relatively bulky, complicated and does not provide for the lateral adjustment of the speaker angle.

U.S. Pat. No. 4,441,557 to Kurihara discloses a direction-variable speaker system including a first and a second speaker case, each containing a speaker. A series of springs and gear cams rotates the second speaker case, which usually houses a high range speaker, about its end, out of the plane of the first speaker and locks it in the desired position. In this out of plane position, the second speaker can then be rotated about its longitudinal axis where it locks in a set position for the purpose of directing high range sound to the listener.

Unfortunately, the Kurihara device suffers from a number of drawbacks. Specifically, although providing for a greater degree of adjustability than the Tanno device, the ability of the Kurihara device to direct high frequency sound to the listener is still limited. Initially, since high frequency speakers are designed with a circular sound source, there is some restriction on the ability of the Kurihara device to precisely direct sound due to the fact that the axis of rotation about which the vertical angle of the second speaker is controlled is located at the end of the second speaker case. Perhaps more importantly, however, due to the structural configuration of the Kurihara device when the second speaker case is positioned to direct sound to the passenger, the Kurihara device can only safely be mounted in limited locations in the passenger compartment. That is, because the second speaker case forms a relatively fragile appendage extending from the mounting surface, there is a substantial risk that it will be damaged by passengers or packages within the vehicle passenger compartment unless the device positioned away from areas so inhabited, such as the rear deck of an automobile. Not only does this make it difficult find a desirable location to mount the Kurihara device in convertibles, which often do not have a rear deck, but due the multiplicity of vehicle layouts, may also make it virtually impossible to find a safe location where the device can be mounted and precisely positioned to direct sound on an unobstructed line to the ears of the occupant. Finally, as with the Tanno design, the Kurihara device is relatively complicated, incorporating a variety of moving parts, each of which is subject to failure.

Thus, a need exists for a simple, sturdy speaker system capable of capable of precisely aiming the sound radiating from the speaker towards a listener, which can be utilized in connection with the multiplicity of vehicle passenger compartment layouts now in use.

SUMMARY OF THE INVENTION

The audio speaker of the present invention satisfies the need of the prior art by providing a simple, sturdy audio speaker which can readily be mounted throughout a vehicle passenger compartment to precisely aim sound radiating from the speaker towards a listener. The audio speaker includes a sound driver, a mount for the sound driver and a housing defining a cavity within which at least a portion of the mount is supported so as to be rotatable about a point within the housing. Accordingly, the audio speaker of the present invention has a greater degree of freedom of movement than the prior art devices, which were limited to movement about two axes. Furthermore, since the point of rotation is within the housing, the housing offers significant protection against mount being damaged. Significantly, this permits the device to be safely mounted in a wide variety of locations in the passenger compartment.

Another important aspect of the invention is an audio speaker having a sound driver, a mount having a center and a housing. The housing defines a cavity within which at least a portion of the mount is rotatably supported in a manner such that the center of the mount is always within the housing. Again, as will appreciated, since the center of the mount is always within the housing over its range of rotation, a significant portion of the housing is protected from damage. This permits the audio speaker to be mounted in a wide variety of locations, without significant risk of damage, while enhancing the likelihood that the speaker can be mounted and precisely positioned to direct sound on an unobstructed line to the ears of the occupant.

Another important aspect of the present invention is an audio speaker having a sound driver, a mount, and a housing, wherein the mount has a maximum dimension. The mount defines three contact areas which interact with at least three contact areas defined by the housing. The mount is at least partially positioned within a cavity in the housing which has a dimension as large as the maximum dimension of the mount (i.e., the greatest distance between two points of the mount along a straight line) such that the interaction of the contact areas of the mount and the contact areas of the housing permit the relative movement of the mount relative the housing, thereby permitting the direction of sound waves emitted through the aperture to be adjusted.

Yet another important aspect of the invention is a speaker system for a passenger compartment of a vehicle including a transparent element of the vehicle, through which occupants can look outside the vehicle, a sound driver and a housing supporting the sound driver. Advantageously, the housing is secured to the transparent element in a location where at least one occupant of the passenger compartment would have had an unobstructed view outside the vehicle. By strategically locating the speaker system where at least one occupant has an unobstructed view outside the vehicle, one greatly enhances the ability of the system to direct unobstructed sound to the ears of the occupant.

Yet another important aspect of the invention is a speaker assembly kit for adapting a multiple component speaker system to a mounting environment to optimize sound imaging at least one location within the listening environment. The kit has a mount defining an interior cavity within which a sound driver is positioned and a plurality of housings having different configurations, wherein each housing configuration is sized and shaped for mounting to a specific type of mounting location. Advantageously, each housing defines a cavity for receiving the mount and includes an aperture sized smaller than the largest dimension of the mount so that the speaker can be assembled from the mount and driver, in combination with any one of the housings.

Other aspects of the invention include methods of making the aforementioned direction variable speaker and a method for adapting a multiple component speaker system to a mounting environment.

BRIEF DESCRIPTION OF THE DRAWINGS

These and other features of the invention will now be described with reference to drawings of a preferred embodiment which is intended to illustrate, and not to limit, the invention, and in which:

FIG 6 through 10 are perspective views illustrating alternative embodiments of speaker devices in accordance with the principals of the present invention;

FIG. 11 is a perspective schematic illustration of a speaker system in accordance with one preferred embodiment of the present invention, installed in an automobile interior.

DESCRIPTION OF THE PREFERRED EMBODIMENT

Figures 1, 2:
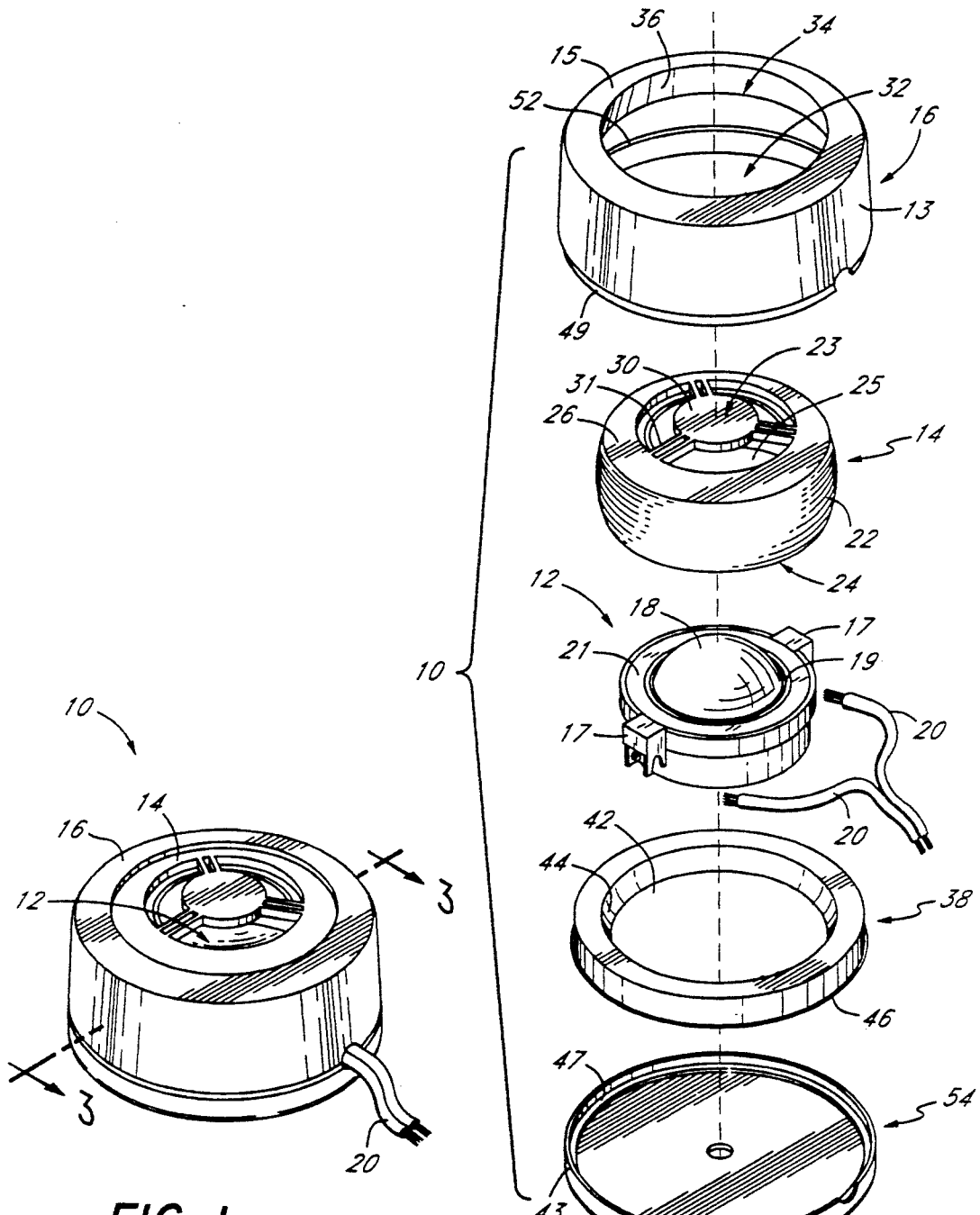
FIG. 1 is a perspective view illustrating a preferred embodiment of a speaker device made in accordance with the principles of the present invention.
FIG. 2 is an exploded perspective view illustrating several components of the device of FIG. 1.

FIG. 1 illustrates a preferred embodiment of the present speaker device 10 which directs clear and unobstructed sound emitted from the speaker to a listener positioned at a location within a listening environment. Preferably, the speaker device 10 installs within a passenger compartment of a vehicle, such as, for example, an automobile, in a position that directs the sound waves radiating from the speaker device 10 to a listener, such as, for example, an automobile driver or a passenger, to achieve the optimum sound image at the location of the listener.

Figure 3:
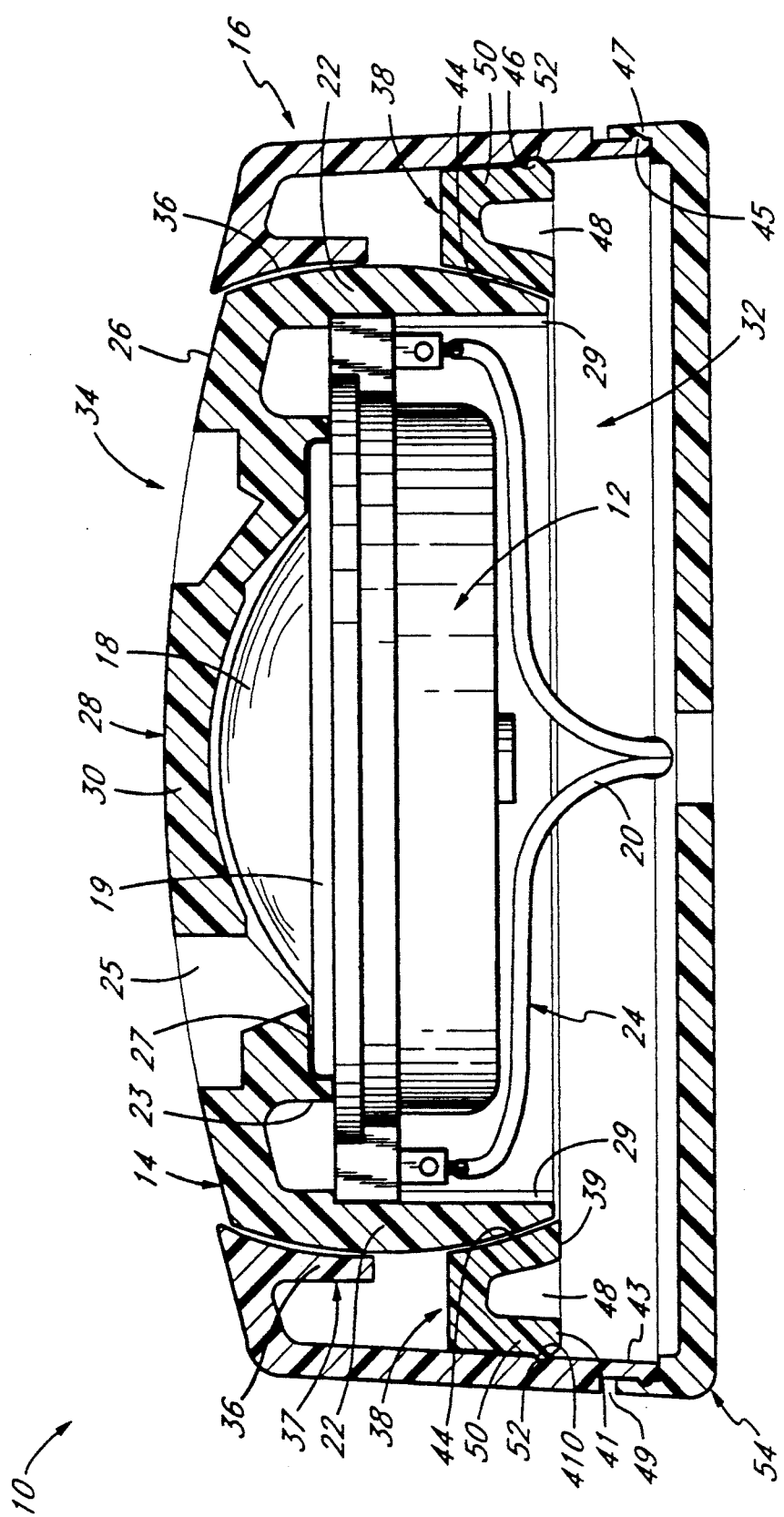
FIG. 3 is a cross-sectional view of the device of FIG. 1 taken along line 3—3.

Referring to FIGS. 1-3, the speaker device 10 includes a sound driver 12 secured within a rotatable mount 14, which is itself secured within a housing 16 by means of a retainer or ring 38. Desirably, the device 10 also incorporates a back shell 54 which seals the back of the housing. The individual components of the speaker device will now be described in detail.

The sound driver 12 is generally disc-shaped with a pair of opposing appendages 17, and includes a central dome 18 from which sound is emitted. As best seen in FIG. 3, the dome 18 is surrounded by a raised annular ridge 19, which is itself surrounded by an annular ledge 21. In view of the desirability of maintaining the compactness of the design, while at the same time providing high-fidelity sound quality, drivers utilizing a neodymium magnet are desirable. Advantageously, the driver 12 used will have a frequency range from 3,000 to 22,000 Hz. The sound driver 12 is connected to an amplifier (not shown) which supplies low voltage electricity to the driver by lead wires 20 secured to the appendages 17 on either side of the driver 12.

The mount 14 is generally disc-shaped and desirably includes an outer wall which defines at least three exterior convex contact areas. Preferably, the outer wall 9 defines an exterior partial spherical surface 22 which defines the contact areas.

The mount defines an interior cavity 24 adapted to house the sound driver 12, as shown in FIG. 3. An aperture 25 through which sound waves are directed connects the cavity 24 to the proximal side of the mount 14. As used herein, the words proximal and distal are used in reference to the proximity to the listener of the sound emanating from the driver. Advantageously, the aperture 25 is partially covered by a protection shield 28 which includes a circular dome cover 30 and three equidistantly spaced support arms 31. The aperture 25 is surrounded by a slightly rounded annular surface 26, preferably having the same radius of curvature as that of the protection shield 28. Advantageously, the protection shield defines an interior surface having a size slightly greater than, and a shape virtually identical to that of the driver dome 18. The mount 14 is advantageously provided with a depending annular ridge 23 and an adjoining annular shoulder 27, which cooperate to define a recess for receiving and retaining the raised annular ridge 19 surrounding the dome 18 of the driver 12. Additionally, as best seen in FIG. 3, the interior of the mount 14 is provided with opposing recessed vertical grooves 29 for receiving and retaining the appendages 17 of the power driver, thereby preventing the rotation of the power driver relative the mount. When assembled, the power driver is secured within the mount by means of epoxy positioned between the annular ledge 21 of the power driver and the recess defined by the depending ridge 23 and shoulder 27 of the mount 14.

The shape of the mount is generally that of a sphere having a top and bottom which have been symmetrically truncated along horizontal planes. As such, the exterior wall 22 of the mount is symmetrical about the center point defined by the spherical surface 22. However, if one were to take cross-sections of the mount 14 perpendicular to the vertical axis of the mount, the cross-sections would define circles of steadily decreasing cross-section as the cross-sections moved further and further from the center point of the sphere. Accordingly, it will be appreciated that at the top at the junction of the outer wall 9 and the annular surface and at the bottom of the outer wall 9 the bottom of the mount 14 would define identical circles having a diameter significantly less than that of the radius of curvature of the spherical walls.

The housing 16 has a slightly upwardly tapering generally cylindrical shape with a body formed by a generally cylindrical wall 13 and an upper annular lip 15. The body defines an interior cavity 32 adapted to receive the mount 14. A central aperture 34 connects the proximal side of the housing 16 with the interior cavity 32. Preferably, the aperture 34 has a diameter smaller than the spherical diameter of the mount 14. Desirably, this diameter is roughly equal to the diameter of the mount at the intersection of the spherical wall 22 and the annular surface 26.

Desirably, the housing defines at least two concave contact areas sized and shaped to prevent the escape of the mount 14 from the interior cavity 32 of the housing 16, while generally permitting the rotation of the mount 14 relative the housing 16. Desirably, the contact areas are formed by the interior surface 36 of a lip 37 depending from the top of the mount 16, and surrounding the aperture 34. Advantageously, the surface 36 is a partial spherical surface having a curvature generally equal to that of the spherical surface 22 of the mount 14. Desirably, these radiuses of curvature are within ±.01 inches and preferably are within 0.005 inches. As a result, the exterior surface 22 of the mount 14 is able to move smoothly but snugly over the partial spherical surface of the housing.

Still referring to FIGS. 1-3, it is desirable that the device 10 be provided with a retainer to secure the mount 14 within a housing 16. The mount desirably defines at least three contact surfaces. AdVantageously, both the contact areas and the contact surfaces of the mount are defined by the partial spherical surface 22 of the mount. The retainer includes at least three contact surfaces which essentially prevent the movement of the spherical surface of the mount 14 away from the contact areas of the housing. Desirably, the retainer is an annular ring 38 having an interior lip 39 and exterior lip 41, wherein the interior lip 39 defines a partial spherical surface 44, having a radius of curvature approximately equal to that of the spherical surface 22 of the mount 14. Desirably, the diameter of the spherical surface at the bottom of the retaining ring is roughly equal to the horizontal diameter of the spherical surface 22 of the mount 14. As with the partial spherical surface of the housing 16, the partial spherical surface 44 of the retaining ring 38 desirably has a radius of curvature approximately equal to that of the spherical surface 22 of the mount 14 within 0.01 inches and advantageously has a radius of curvature equal within ±0.005 inches. Again, this permits the snug but smooth sliding of the spherical surface of the ball against the partial spherical surface of the retaining ring.

Advantageously, the annular ring 38 is provided with a securing mechanism to prevent movement of the center of the speaker drive, as the speaker rotates. For this reason, the exterior lip 41 of the retaining ring is provided with an external annular flange 46 sized and shaped to mate with an annular groove 52 along the internal surface of the cylindrical wall 13 of the housing 16. FIG. 3 illustrates the annular ring 38 and housing 16 in the locked position.

To further protect the speaker drive 12 and to provide a flat mounting surface, if so desired, the speaker device 10 may be provided with a disc-shaped shell 54. Preferably, the shell 54 can be quickly and easily secured to the exterior wall 13 of the housing 16. Advantageously, this can be accomplished by means of an annular recess 49 at the bottom of the housing 16, near the bottom of which is an annular flange 43 and a raised annular lip 45 along the circumference of the back shell 54, the interior of which is provided with an annular groove 47 for mating with the flange of the recess.

Once assembled, the speaker device 10 can be mounted in a wide variety of looations within the passenger compartment of a vehicle to ensure the unobstructed direction of high-frequency sound to the ears of the occupant. To ensure the precise direction of the sound toward the ears of the driver, the housing can be manually swiveled within the housing about the center of the mount. Since the rotation occurs about the center of the power driver, there is no restriction on the direction the sound emanating from the apertures of the mount can be directed over a wide range of freedom. Furthermore, limitations on the outer limits of the freedom of movement of the mount are compensated by the fact that the configuration of the speaker device 10 is such that the speaker can be mounted virtually anywhere within the passenger compartment.

Figure 4:
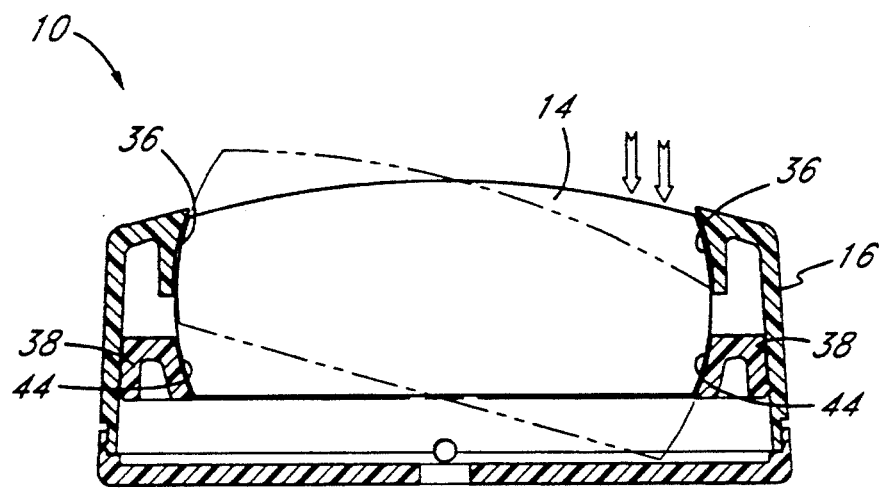
FIG. 4 and 5 are schematic partial sectional views of the device of FIG. 1 illustrating the movement of the ball within the housing.
Figure 5:
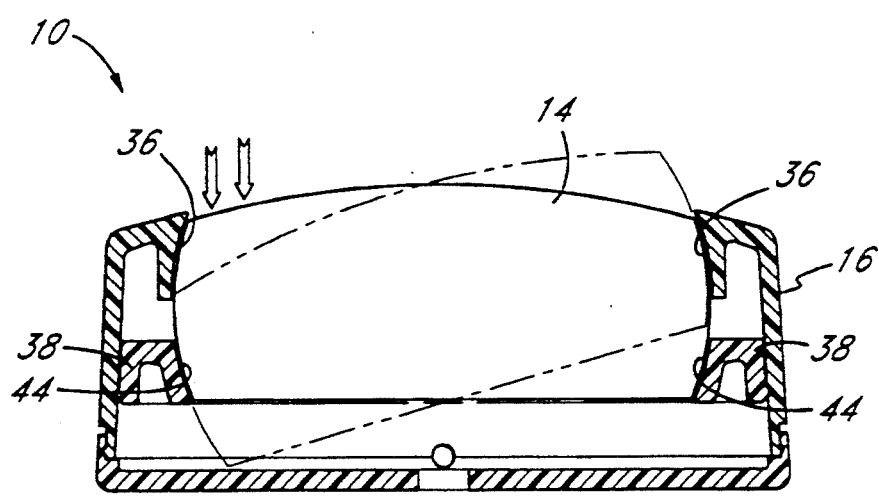

Specifically, when mounted in a vehicle, the speaker device 10 can precisely direct the sound waves radiating from the aperture 25 of the speaker towards a listener. By applying a manual force at a point on the circumference of the mount annular surface 26, the mount 14 pivots about a point within the housing 16 in the direction of the force, as shown in FIGS. 4 and 5. As a result, sound can be aimed in any direction as the mount 14 rotates in the housing 16, without significantly projecting from the housing 16. Advantageously, the mount 14 maintains the desired orientation until it is manually repositioned due to its frictional engagement with the contact areas of the housing and contact surfaces of the retainer.

The compact size of the speaker device 10 allows it to be mounted virtually throughout passenger compartment. The speaker device 10 can be mounted in or on conventional rear deck, dash and door panels and yet pre-custom-aims the sound towards the listener, not towards the headliner or the listener's feet. The speaker device 10 also mounts to less conventional locations, such as, for example, on a headliner or on a windshield or window, as shown in FIG. 11. As a result of satellite location at unobstructive locations on windshields and windows, high frequency speakers optimally direct sound towards the listener without interference by other passenger compartment components, such as, for example, seats or head rests.

Each listening environment is unique (i.e., each model of vehicle varies in interior layout and dimension) and no single speaker ideally suits every environment. Thus, there has been provided in accordance with another aspect of the present invention a modular driver-housing system for adapting a multiple component speaker system to a unique mounting environment to optimize sound imaging in at least one location within the listening component environment.

The modular system comprises the sound driver 12, mount 14 and retainer 38, as described above. The modular system additionally comprises a plurality of support components adapted to produce a variety of speaker designs depending upon the mounting surfaces in the particular listening environment. The plurality of support components comprises a group of housings constructed in accordance with the above description, and having external configurations of surface housings 16 (as shown in FIG. 1 and described above), panel housings 16a (as shown in FIG. 6) and pillow housings 16b (as shown in FIG. 7). The plurality of support components further comprises a group of back shells, some adapted to couple with the housings (e.g., the housing flat back shell 54, the housing angles back shell 54c and pillow housing back shell 54b, as shown in FIGS. 1, 8 and 7, respectively), others adapted to couple directly with the mount 14 to form a miniature stationary speaker device 10d, as shown in FIG. 9 (illustrating a mount flat back shell 54d), and speaker device 10e, as shown in FIG. 10 (illustrating a mount angled back shell 54e). The individual support compartments of the modular system, which have not previously been described, will now be described in detail.

FIG. 6 illustrates the panel housing 16a having a generally mushroom shaped body formed by a cylindrical wall 58 and an upper flange 60 which extends beyond the cylindrical wall 58. The body defines an interior cavity 32a preferably having an aperture 34a of a diameter smaller than the spherical diameter of the mount 14. Desirably, the housing includes a lip 37a, similar to lip 37 described above, depending from the aperture 34a into the interior cavity 32a.

The pillow housing 16b, as illustrated in FIG. 7, has a truncated pentahedron body formed by a top plate 62 and four side plates 64 oblique to the top plate 62. The body defines an interior cavity 32b having a lip 37b similar to that described above in reference to the first housing embodiment (i.e., the surface housing 16). The top plate 62 comprises an aperture 34b opening into the interior cavity 32b and having a diameter sized smaller than the spherical diameter of the mount 14.

FIG. 7 further illustrates the pillow housing back 54b which likewise has a generally truncated pentahedron shape. The back shell 54b attaches to the pillow housing 16b along the four side plates 64 in a similar manner to that previously described with regard to the first embodiment.

FIG. 8 illustrates the housing angled back shell 54c attached to the surface housing 16. The back shell 54c generally has a wedge-shaped profile and comprises a generally cylindrical body having a proximal end 66 oblique to a distal end 68. A back plate 70 encloses the distal end 68 of the back shell 54c. The back shell 54c additionally comprises an annular flange/recess arrangement, similar to that described above in reference to the flat back shell 54, disposed around the proximal end 66 to facilitate quick and easy attachment with the surface housing 16.

FIGS. 9 and 10 illustrate embodiments of the speaker devices which are stationary, i.e., the mount 14 does not rotate. Speaker device 10d, as illustrated in FIG. 9, comprises the mount 14, the sound driver 12 and a disk-shaped mount flat back shell 54d. The flat back shell 54d has a diameter that generally matches the diameter on the mount 14 on its distal side and attaches to the mount 14 by an epoxy adhesive.

The speaker device 10e shown in FIG. 10 comprises an angled back shell 54e coupled with the mount 14. The angled back shell generally has a wedge-shaped profile and comprises a generally cylindrical body having a proximal end 72 oblique to a distal end 74. A back plate 76 encloses the distal end 74 of the back shell 54e. Around the proximal end, the angled back shell 54e includes an annular flange 78 (not shown) projecting from the wall of the back shell 54e in the longitudinal direction. Preferably the outer diameter of the flange 78 is slightly greater than the inner diameter of the interior cavity 24 at the distal end of the mount 14. The back shell 54c secures to the mount 14 by inserting the flange 78 into the interior cavity 24 to produce an interference fit between the two components.

From the modular system, the speaker device design may be customized to a unique mounting surface. For example, when mounting a speaker in a panel, such as, for example, a dash or door panel, the speaker device 10a comprises the principal components of the mount 14, sound driver 12 and retainer 38, and the panel housing 16a, as shown in FIG. 6. When mounting a speaker on a windshield or window, the speaker device 10c comprises the principal components plus the surface housing 16 and the housing angled back shell 54c, as shown in FIG. 8. If the speaker device is preferred stationary, the speaker device 10e comprises only the mount 14, speaker driver 12 and the mount angled back shell 54e.

Therefore, it is understood that numerous speaker devices can be assembled from the single sized mount 14 housing the sound driver 12 with a plurality of housing and back cover configurations to adapt the speaker device to a unique mounting surface. As a result, the speaker system is more flexible to adapt to the gamut of automobile interior layouts without substantially increasing the amount of inventory that a retailer must have on hand to customize an automobile stereo system to the unique passenger compartment listening environment.

Although this invention has been described in terms of certain preferred embodiments, other embodiments that are apparent to those of ordinary skill in the art are also within the scope of this invention. Accordingly, the scope of the invention is intended to be defined only by the claims which follow.

What is claimed is:

1. A speaker, comprising:
   a sound driver having a dome;
   a mount defining an aperture, a generally rounded surface and an internal cavity adapted to receive said sound driver, wherein said dome of said sound driver is juxtaposed to said aperture when inserted into said internal cavity;
   a housing unit forming an interior cavity adapted to receive said mount, said mount being rotatable within said housing unit about a point positioned within said housing unit to enable the direction of sound waves emitted from said driver through said apertures to be varied, wherein said aperture is sized smaller than the largest dimension of said mount taken along a line intersecting said point; and
   a retainer secured to said housing opposite said aperture to retain said mount within said housing, wherein said retainer comprises an annular ring having a rounded surface disposed about the inner diameter of said ring, said rounded surface having a curvature that is roughly equal to that of said rounded surface of said mount. surface having a curvature that is roughly equal to that of said rounded surface of a mount.

2. The speaker of claim 1, wherein said annular ring additionally comprises a securing flange disposed about an exterior diameter of said ring, and said housing additionally comprises a securing groove disposed about an annular inner wall of said interior cavity and adapted to receive said securing flange to couple said annular ring with said housing.

3. A speaker for mounting on a supporting structure in a listening environment adapted to swivel to direct sound emitting from said speaker towards a listener, without said speaker obtrusively protruding from said supporting structure, comprising:
   a sound driver;
   a mount defining a partial generally spherical exterior surface having a diameter and an internal cavity adapted to receive said sound driver;
   a housing defining an interior cavity, an aperture sized smaller than said diameter of exterior surface of said mount and at least three concave contact portions disposed proximate to said aperture, said concave contact portions having a curvature generally equal to said radius of said mount exterior surface, said cavity having at least two securing slots positioned along a wall of said cavity; and
   a retainer comprising an annular ring having at least three concave contact portions disposed proximate to an inner diameter of said annular ring and at least two securing flanges disposed proximate to an outer diameter of said annular ring, said concave contact portions having a curvature generally equal to said radius of said mount exterior surface, said annular ring being adapted to insert into said housing cavity to a lock position in which said securing flanges insert into said securing slots and said housing contact portions and said annular ring contact portions generally form a spherical cavity having a radius generally equal to that of said mount;
   wherein said mount generally fills said spherical cavity formed between said annular ring contact portions and said housing contact portions, said sound driver inserted in said mount being rotatable within said housing about a point recessed with said housing to enable varying positioning of said sound driver without obtrusively protruding from said housing.

4. The speaker of claim 3, wherein said mount is manually rotatable within said spherical cavity.

5. The speaker of claim 4, wherein said housing further comprises a plurality of contact portions disposed in an annular arrangement and said annular ring further comprising a plurality of contact portions disposed in an annular arrangement.

6. The speaker of claim 5, wherein said housing contact portions form an annular surface within said housing cavity and said annular ring contact portions form an annular surface around said ring inner diameter.

7. The speaker of claim 3, wherein said securing slots from an annular groove about said housing cavity and said securing flanges form an annular flange about said exterior diameter of said annular ring.

8. The speaker of claim 4, wherein said mount fictionally engages with said contact portions to hold said mount in a desired position with respect to said housing.

9. The speaker of claim 5, wherein said mount additionally comprises a generally flat, annular surface having an aperture sized smaller than said sound driver, said sound driver comprising a dome and being adapted to insert into said mount with said dome positioned at said aperture, said mount being manually rotatable within said spherical cavity by applying a force at a point around the circumference of said annular flat surface.

10. A method of making a direction-variable speaker to endable the directing of sound emitted from said speaker towards a listener in a unique listening environment, comprising the steps of:
   inserting a sound driver having a dome into a mount having an aperture and positioning said dome of said sound driver proximate to said aperture of said mount;
   inserting said mount into a cavity in a housing defining an aperture sized smaller than the maximum dimension of said mount;
   inserting a retainer ring having an inner diameter sized smaller than the largest dimension of said mount into said housing to secure said mount between said housing aperture and said retainer ring; and
   coupling said retainer ring to said housing.

11. The method of claim 10, additionally comprising the steps of:
   configuring said housing to have a rounded, annular contact portion having a curvature that generally matches that of said ball; and
   configuring said retainer ring to have a rounded, annular contact portion having a curvature that generally matches that of said ball.

* * * * *

UNITED STATES PATENT AND TRADEMARK OFFICE
CERTIFICATE OF CORRECTION

PATENT NO. : 5,133,428

DATED : July 28, 1992

INVENTOR(S) : John K. Persson

It is certified that error appears in the above-identified patent and that said Letters Patent is hereby corrected as shown below:

On the title page: directly under United States Patent, change "Perrson" to --Persson--

At [76], please change "John K. Perrson" to --John K. Persson--

Signed and Sealed this

Sixteenth Day of February, 1993

*Attest:*

STEPHEN G. KUNIN

*Attesting Officer*   *Acting Commissioner of Patents and Trademarks*

UNITED STATES PATENT AND TRADEMARK OFFICE
CERTIFICATE OF CORRECTION

PATENT NO. : 5,133,428
DATED : July 28, 1992
INVENTOR(S) : John Kenneth Persson

It is certified that error appears in the above-indentified patent and that said Letters Patent is hereby corrected as shown below:

```
    In Column 8, line 63, change "mount. surface having a curvature
that is roughly equal to that of said rounded surface of a mount." to
--mount.--.

In Column 10, line 24, change "to endable" to --to enable--.
```

Signed and Sealed this

Fourteenth Day of December, 1993

Attest:

BRUCE LEHMAN

*Attesting Officer*     *Commissioner of Patents and Trademarks*